(12) United States Patent
Starkey et al.

(10) Patent No.: US 10,175,094 B2
(45) Date of Patent: Jan. 8, 2019

(54) FIBER OPTIC COMMUNICATIONS WITH SUBSEA SENSORS

(71) Applicants: Michael G. Starkey, Ashtead (SE); Kevin T. Corbett, Missouri City, TX (US)

(72) Inventors: Michael G. Starkey, Ashtead (SE); Kevin T. Corbett, Missouri City, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 300 days.

(21) Appl. No.: 14/930,798

(22) Filed: Nov. 3, 2015

(65) Prior Publication Data

US 2016/0161327 A1   Jun. 9, 2016

Related U.S. Application Data

(60) Provisional application No. 62/087,709, filed on Dec. 4, 2014.

(51) Int. Cl.
   *G01H 9/00*   (2006.01)
(52) U.S. Cl.
   CPC .................... *G01H 9/004* (2013.01)
(58) Field of Classification Search
   CPC ....... G01H 9/004; E21B 47/14; E21B 47/123; E21B 47/10; E21B 47/12; E21B 47/101; G01V 1/44; G01V 1/226
   See application file for complete search history.

(56) References Cited

U.S. PATENT DOCUMENTS

| 4,852,067 A | * | 7/1989 | White | G01V 1/44 367/31 |
| 4,951,677 A | * | 8/1990 | Crowley | A61B 5/6848 600/109 |
| 5,083,452 A | | 1/1992 | Hope | |
| 5,675,674 A | * | 10/1997 | Weis | E21B 47/123 250/227.18 |
| 6,305,227 B1 | * | 10/2001 | Wu | E21B 47/123 73/705 |
| 6,915,686 B2 | * | 7/2005 | Baustad | E21B 47/01 73/152.36 |

(Continued)

OTHER PUBLICATIONS

Roberts, "Subsea Integrity Monitoring Using Fibre Optic Strain Sensors," Scandinavian Oil-Gas Magazine, No. 7/8, 2007, pp. 161-162, 164, 166, http://www.disensors.com/downloads/products/Subsea%20Strain%20Gauging%20Application_790.pdf).

(Continued)

*Primary Examiner* — Helen C Kwok
(74) *Attorney, Agent, or Firm* — ExxonMobil Upstream Research Company—Law Department

(57) ABSTRACT

The present techniques are directed to systems and methods for monitoring parameter data from sensors, for example, in a subsea environment. In one method, an electrical signal including data from the subsea unit is converted into an acoustic signal. The acoustic signal is directed through the water column towards a fiber optic cable. The acoustic signal is detected by changes in a light signal carried in the fiber optic cable, and the changes in the light signal are decoded to obtain a data stream representing the parameter data.

26 Claims, 6 Drawing Sheets

(56) References Cited

U.S. PATENT DOCUMENTS

| | | | |
|---|---|---|---|
| 7,999,695 B2* | 8/2011 | Rodney | E21B 47/12 340/853.3 |
| 8,315,486 B2 | 11/2012 | Pearce et al. | |
| 9,055,869 B2* | 6/2015 | Li | G01N 21/1702 |
| 9,557,195 B2* | 1/2017 | Barfoot | G01D 5/35338 |
| 9,732,584 B2* | 8/2017 | Roddy | E21B 33/13 |
| 2003/0205083 A1* | 11/2003 | Tubel | E21B 23/03 73/152.19 |
| 2004/0141420 A1* | 7/2004 | Hardage | E21B 47/00 367/149 |
| 2010/0107754 A1* | 5/2010 | Hartog | E21B 47/101 73/152.47 |
| 2011/0088462 A1* | 4/2011 | Samson | E21B 47/10 73/152.18 |
| 2012/0017687 A1 | 1/2012 | Davis et al. | |
| 2013/0167628 A1* | 7/2013 | Hull | G01V 1/001 73/152.58 |
| 2013/0298635 A1 | 11/2013 | Godfrey | |
| 2014/0204712 A1* | 7/2014 | Skinner | E21B 47/14 367/81 |
| 2014/0216151 A1 | 8/2014 | Godfrey et al. | |
| 2014/0219056 A1* | 8/2014 | Samson | E21B 47/14 367/81 |
| 2014/0290936 A1* | 10/2014 | Wills | E21B 43/26 166/250.1 |
| 2015/0071034 A1* | 3/2015 | Wills | G01V 1/28 367/25 |
| 2015/0354351 A1* | 12/2015 | Morrow | E21B 47/01 367/82 |
| 2016/0047927 A1* | 2/2016 | Sollner | G01V 1/301 367/7 |
| 2016/0245077 A1* | 8/2016 | Willis | E21B 47/102 |
| 2016/0245941 A1* | 8/2016 | Ronholt | G01V 1/282 |
| 2016/0273335 A1* | 9/2016 | Quintero | G01V 5/101 |
| 2016/0363694 A1* | 12/2016 | Roy | E21B 47/14 |
| 2017/0145819 A1* | 5/2017 | Maida, Jr. | E21B 49/08 |

OTHER PUBLICATIONS

Thomson, et al., "Real Time Monitoring of a New 10ksi Drilling Riser Design," presented at Subsea Asia 2010, Schlumberger, Kuala Lumpur, Malaysia.

Roberts, "Retrofittable Stress Measurements for Deepwater Risers and Flowlines," presented at DeepGulf 2007, Dec. 2007, New Orleans, Louisiana.

* cited by examiner (Prior Art)
100

300

FIBER OPTIC COMMUNICATIONS WITH SUBSEA SENSORS

CROSS-REFERENCE TO RELATED APPLICATION

This application claims the priority benefit of U.S. Provisional Patent Application 62/087,709, filed Dec. 4, 2014, entitled FIBER OPTIC COMMUNICATIONS WITH SUBSEA SENSORS, the entirety of which is incorporated by reference herein.

FIELD

The present disclosure relates generally to communicating with subsea sensors using fiber optic systems. More specifically, the present disclosure provides a transducer to acoustically link subsea sensors to a fiber optic detector to carry parameter data.

BACKGROUND

Conventional offshore production facilities often have a floating facility or fixed platform stationed at the water's surface and subsea equipment, such as a Christmas tree or other type of wellhead, positioned over the subsea wells at the mud line of a seabed. The production wells drilled in a subsurface formation typically produce fluids, such as oil, gas, and water, to the subsea wellhead. Produced fluids from multiple wells may be comingled through a manifold. This fluid (wellbore fluid) may be carried to a surface vessel, such as a Floating Production Storage and Offloading vessel (FPSO) or other vessel, to a fixed platform, or to shore for processing. However, processing in the vicinity of the well head provides a number of advantages. For example, separation of natural gas and water from the hydrocarbon stream before cooling may reduce the formation of hydrates in the production lines. In other examples, subsea units may be used to inject additives and other materials into production lines or wellbores.

Physical parameters of the subsea equipment can be monitored to adjust the operation. In one example, the measurement of pressure and temperature in a well's annulus may be used to monitor annulus pressure integrity. In a second example, the levels in a subsea separation unit may be used to adjust flow rates of fluids entering and exiting the equipment. Currently, parameter data may be monitored by sensors connected directly to a subsea control module (SCM) by electrical leads. The data is then sent via communications lines in umbilical lines that reach from the surface or from onshore centers. The number of lines available for monitoring is pre-determined and thus fixed. Accordingly, the flexibility of the systems may be limited. Further, the leads and connections may be vulnerable to water infiltration.

Fiber optic lines have been used for measuring parameters of systems using the detection of acoustic signals by changes in an optical signal in the fiber optic line. For example, International Patent Publication No. WO 2013/045941 discloses a system for monitoring the flow of fluids within conduits, such as pipes, using a fiber optic system based on distributed acoustic sensing (DAS). A disclosed method can determine flow rate or flow regime within a conduit, such as within a production well or a pipeline. Embodiments involve introducing an acoustic stimulus into the fluid within the conduit. An optical fiber deployed along the path of the conduit is interrogated to provide a DAS sensor. The acoustic signal detected by a plurality of channels of the DAS sensor is analyzed to determine at least one flow characteristic. Analyzing the acoustic signal includes identifying reflections of the acoustic stimulus caused by the fluid within the conduit and analyzing the reflections to determine any Doppler shift.

Other techniques have been proposed for using acoustic coupling with fiber optics to communicate with sensors. For example, U.S. Patent Application Publication No. 2012/0017687 discloses a remote sensing system. In the remote sensing system, a plurality of sensors output information into a DAS system through acousto-mechanical signals. The sensors are indirectly coupled by the acousto-mechanical signal to an optic fiber at the center of the DAS system, wherein the acousto-mechanical signal is transmitted through an intermediary body, such as the ground or a conduit.

More effective and flexible communications between subsea units and control sites is desired as these types of units become more common and more complex.

SUMMARY

An exemplary embodiment described herein provides a sensing system. The sensing system includes a sensor, a transducer unit, a fiber optic system, a fiber optic analyzer, and a deconvolution system. The sensor is configured to measure parameter data. The transducer unit is configured to convert an electrical signal from the sensor that is representative of the parameter data into an encoded acoustic signal representative of the electrical signal. The fiber optic system is in proximity to the transducer unit and is configured for monitoring or transferring data not related to the parameter data and detecting the acoustic signal. The fiber optic analyzer is configured to decode optical signals from the fiber optic system to produce a data stream, and the deconvolution system is configured to separate the parameter data from the data stream.

Another embodiment provides a method for monitoring a subsea unit. The method includes converting an electrical signal including parameter data from the subsea unit into an acoustic signal and directing the acoustic signal through a water column towards a fiber optic cable. The acoustic signal is detected by changes in a light signal carried in the fiber optic cable. The changes in the light signal are decoded to obtain a data stream representing the parameter data.

Another embodiment provides a method for monitoring data. The method includes converting an electrical signal including parameter data into an acoustic signal. The acoustic signal is detected by changes in a light signal carried in a fiber optic cable that is also carrying other data unrelated to the parameter data. The light signal is converted into an electrical signal representing a data stream. The electrical signal is deconvoluted to separate the parameter data from the data stream.

Another embodiment provides a sensing system. The sensing system includes a sensor, a transducer unit, a fiber optic system, and a fiber optic analyzer. The sensor is configured to measure parameter data. The transducer unit is configured to convert an electrical signal from the sensor that is representative of the parameter data into an encoded acoustic signal representative of the electrical signal. The fiber optic system is in proximity to the transducer unit and is configured for detecting the acoustic signal. The fiber optic analyzer is configured to decode optical signals from the fiber optic system to produce a data stream.

DESCRIPTION OF THE DRAWINGS

The advantages of the present techniques are better understood by referring to the following detailed description and the attached drawings, in which.

DETAILED DESCRIPTION

Figure 1:
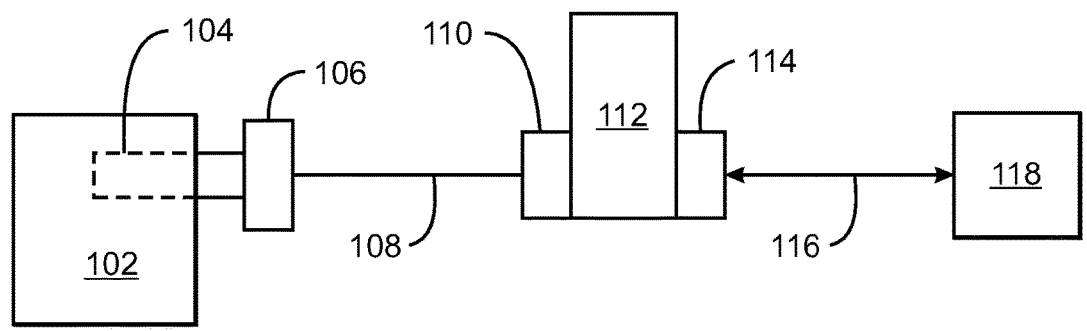
FIG. 1 is a block diagram of a current system that uses normal subsea cables to transmit parameter data from a subsea sensor.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "acoustic signal" refers to one or more sound waves that are transmitted through a solid, liquid, and/or gaseous material as a result of the mechanical vibrations of the particles forming the material. The normal mode of wave propagation is longitudinal, i.e., the averaged direction of motion of the particles is parallel to the direction of wave propagation. The wave, therefore, consists of compressions and rarefactions of the material. The sound waves may be modulated to form the signal, for example, by frequency or pulsing.

A "facility" is a tangible piece of physical equipment, or group of equipment units, through which hydrocarbon fluids are either produced from a reservoir or injected into a reservoir. In its broadest sense, the term facility is applied to any equipment that may be present along the flow path between a reservoir and its delivery outlets, whether located subsea or on the surface (e.g., topsides or on-shore). Facilities may comprise production wells, injection wells, well tubulars, wellhead equipment, gathering lines, manifolds, pumps, compressors, separators, surface flow lines, and delivery outlets.

As used herein, a "sensor" is a device that detects, determines, monitors, records, or otherwise senses the absolute value of or a change in a physical quantity. A sensor as described herein can be used to measure physical quantities including, for example, temperature, absolute pressure, differential pressure, flow rate, acoustic data, pH level, salinity levels, chemical concentration, valve positions, or almost any other physical data.

A "subsea sensor" is a sensor that is located on a "subsea unit," wherein the subsea unit may include any type of unit used for underwater operations, such as hydrocarbon production, hydrocarbon processing, hydrocarbon transportation, hydrate mining, remote operated vehicle operations, monitoring communications lines, and the like. The water environment may be in the ocean or may be in a lake, a river, or any other aqueous environment.

A "transducer" or "transducer unit" refers to any device that converts input energy of one form into output energy of another. One example of a transducer is a piezoelectric crystal, which can be used to convert energy between electric signals and acoustic signals.

As used herein, a "fiber optic system" uses a fiber optic cable to detect environmental conditions, communicate data between locations, and the like. The fiber optic system includes a light source that can generate light from a modulated or unmodulated electrical signal. The light is carried through the fiber optic cable to a destination, at which point a detector converts the light into an electrical signal for analysis. The destination may be proximate to the source, for example, in the use of time domain reflectometry, in which light pulses are sent down the fiber optic cable and backscattered towards a detector.

As used herein, "parameter data" refers to any data that can be measured by a sensor or calculated from a sensor reading. Generally, parameter data will include data on physical quantities, such as temperature, absolute pressure, differential pressure, flow rate, pH level, salinity levels, chemical concentration, valve positions, and the like.

"Deconvolution" refers to a mathematical operation on a parent data stream that separates the parent data stream into individual child data streams that, when added together, make up the parent data stream. This can be done by filtering the data based on location, frequency, time, or any other relevant measurement.

"Proximate" refers to physical closeness between an item and another item. The items may be in direct contact or close enough, for example, for one item to influence the behavior or function of the other item.

Overview

Subsea sensors are sensors designed to be used in a subsea environment and are used to provide real-time information on various production, injection, and processing parameters, for example, pressure, temperature, flow rate, and erosion or corrosion. Sensors are located, for example, on subsea trees, manifolds, process equipment modules, flow lines, and pipelines.

FIG. 1 is a block diagram of a current system 100 that uses normal subsea cables to transmit parameter data from a subsea unit 102. The subsea unit 102 has a subsea sensor 104 to detect a parameter, as described herein. The subsea sensor 104 has a cable connector 106 that is coupled to a cable 108 to receive electrical power and transmit data. The cable connector 106 may be wet-mated or dry-mated. A wet-mated connector would be able to be disconnected and reconnected under water, while a dry-mated connector is design to be connected in air prior to being submerged. A wet-mated connector allows cables to be changed under water, reducing the need for equipment to be pulled to the surface.

The cable 108 is coupled to another cable connector 110 located on a subsea control module mounting base and connected to the SCM 112. The SCM 112 processes the data for transmission. Another cable connector 114 joins the SCM 112 to an umbilical cable 116 that may provide power to the SCM 112 and transmit data from the SCM 112 to a host facility 118. The host facility 118 may be located topsides or on-shore.

However, subsea sensors 104, cable connectors 106, and SCMs 112 may have low reliability, for example, due to the aggressive, high pressure subsea environment. The failure of any of the components in the data chain will result in loss of information concerning subsea parameters. In addition, current subsea control systems are designed with a fixed number of sensor connection points to the SCM 112. This may limit the flexibility to repair and reconnect failed sensors or expand the number of sensors if the system equipment is pulled for maintenance or reconfiguration.

An alternative means of transferring parameter data collected by subsea sensors 104 to a host facility 118 is to use an optical fiber system located in proximity to the unit. The electrical signals representing the parameter data is converted to acoustic signals, which can be detected by the optical fiber, for example, from changes in light transmitted through the fiber. This is discussed further with respect to FIG. 2.

Monitoring Parameter Data

Figure 2:
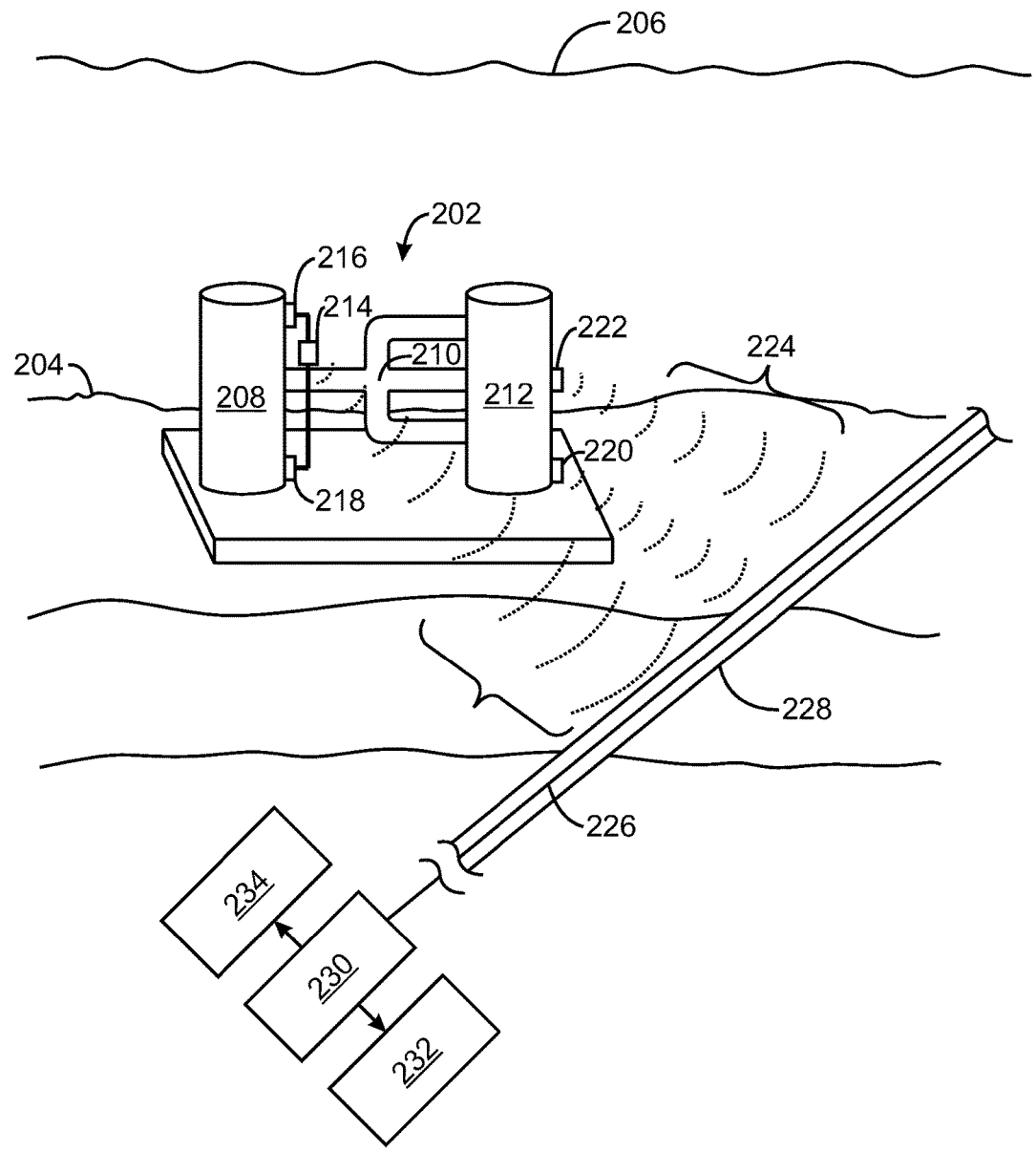
FIG. 2 is a schematic diagram of an example of monitoring a subsea unit by converting parameter data into acoustic signals, which are detected by a proximate fiber optic cable.

FIG. 2 is a schematic diagram of an example 200 of monitoring a subsea unit by converting parameter data into acoustic signals, which are detected by a proximate fiber optic cable. In FIG. 2, the subsea unit 202 is located on the sea floor 204 below the ocean surface 206. As described herein, the techniques are not limited to oceanic applications, but may be used in any appropriate underwater environment, including lakes and larger rivers, among others. The subsea unit 202 may include wellheads, manifolds, processing vessels, and transportation lines, among others. For example, the subsea unit 202 may have an inlet vessel 208, a pipe separator 210, and an outlet vessel 212. Each of these components, including the vessels 208 and 212, or the pipe separator 210 may have various sensors for parameters.

As an example, the inlet vessel 208 may have a level sensor 214 that determines the pressure differential between an upper pressure sensor 216 and a lower pressure sensor 218. Similarly, the outlet vessel 212 may have a temperature sensor 220 and an interface height sensor 222. The sensors 214, 220, and 222 may include a transducer that converts the electrical signal from the sensors into acoustic signals 224, which can be transmitted through the water column towards a fiber optic cable 226. In this example, the fiber optic cable 226 is in use as an acoustic sensor monitoring the status of a pipeline 228. In other embodiments, the fiber optic cable 226 may be part of a communications system, such as between an off-shore platform and an on-shore control room. Such fiber optic communication systems may be available from OTN Systems of Olen, Belgium. For example, the fiber optic cable 226 may be part of a fiber optic backbone between platforms for voice, data, local area network (LAN), SCADA, and the like. Other fiber optic systems may be available from Ocean Design, Inc. of Daytona Beach, Fla., USA. In some embodiments, the fiber optic cable 226 may be dedicated to carrying the parameter data and not used for any other purpose.

An analysis unit 230, such as a DAS system, is optically coupled to the fiber optic cable 226. The analysis unit 230 detects the light that passes through the fiber optic cable 226 generating an electrical signal that is representative of the light. The analysis unit 230 may also provide the light to the fiber optic cable 226.

The electrical signal may include multiple frequencies and intensities that occur over the time that the signal is detected. The detection time may represent the distance from the detector, for example, if a pulsed optical signal is used in a time-domain reflectometry analysis. The analysis unit 230 can deconvolute the electrical signal to separate out the data from the subsea unit 202, which may be sent to a control or monitoring system 232. The deconvolution portion of the analysis unit 230 may use any number of technologies to separate the data. For example, the data separation may be performed as an analog function using a series of bandpass filters to separate out the data. In these techniques, a high frequency bandpass filter may be used to remove the lower frequency signals associated with the acoustic signal from the data, and a high frequency filter may be used remove the high frequency data stream, leaving the data associated with the acoustic signal. The control or monitoring system 232 may be a distributed control system, for example, available from Honeywell International of Morristown, N.J., USA. In some embodiments, the analysis unit 230 may be a module in the control or monitoring system 232 that performs a digital separation of the data, such as a module that performs a fast Fourier transform (FFT) on the data, separates the data in the frequency domain, and reverses the FFT to provide separate data streams.

Data that is not associated with the subsea unit 202 may be sent on to other units 234, such as a pipeline monitoring system or a network interface. For example, a pipeline monitoring system may include any number of technologies known in the art, such as a supervisory control and data acquisition (SCADA) system used to monitor and control devices and sensors along a subsea line, among others. Any number of other types of subsea equipment monitoring systems may be used in addition to or instead of a pipeline monitoring system. In some embodiments, a network interface may include a router or other network interface that couples the data to a LAN, wide area network (WAN), or the Internet, among others.

Figure 3:
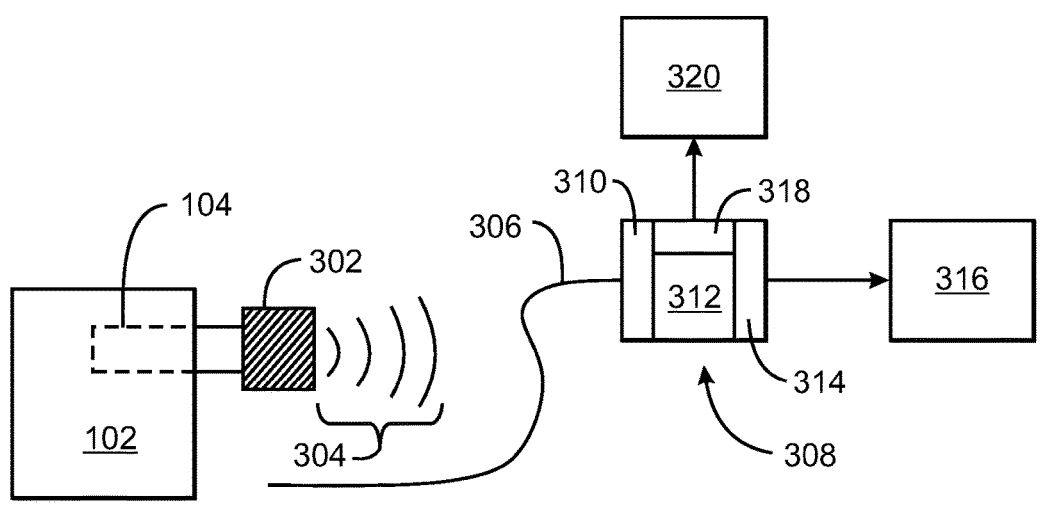
FIG. 3 is a schematic view of a single sensor reading being detected by a fiber optic cable.

FIG. 3 is a schematic view 300 of a reading from a single sensor being detected by a fiber optic cable. Like numbered items are as discussed with respect to FIG. 1. As shown in this example, an acoustic transducer unit (ATU) 302 is interfaced with the subsea sensor 104. The ATU 302 converts the electrical signal from the subsea sensor 104 into an acoustic signal 304. The acoustic signal 304 may be continuous or intermittent. The frequency and bandwidth of the acoustic signal 304 may be chosen to optimize transmission through seawater and may be encoded in a way to maximize signal to noise ratio.

The acoustic signal 304 may be encoded in a way to identify the sensor and carry the data. For example, the acoustic signal 304 may be a sequence of pulses that includes a header identifying the sensor and a data sequence that encodes the parameter data as a serial pulse sequence. In some embodiments, the acoustic signal 304 may be a series of high frequency pulses limited by the analysis frequency. As one example, the acoustic signal 304 may include 200 millisecond (ms) bursts of 30 kilohertz (KHz) signals, wherein the bursts may represent digital ones. In this example, the analysis frequency would be greater than about 60 KHz to enable the signal to be analyzed without frequency doubling. The timing and frequency of the encoded signals may depend on a number of factors, such as the frequencies of other data being carried by the fiber optic cable, the number of units that will be transmitting data, and the sensitivity of the fiber.

The signal from the ATU 302 is detected by a fiber optic cable 306. The fiber optic cable 306 may be laid in proximity to the ATU 302 or the ATU 302 may be located in proximity to the fiber optic cable 306. The fiber optic cable 306 may be specifically used for detection of the signal from the ATU 302 or may be used for other purposes in addition to the signal detection. For example, the fiber optic cable 306 may be used to monitor a pipeline that is proximate to the subsea unit, as described with respect to FIG. 2. Further, the fiber optic cable 306 may be used to detect parameters from transducers measuring parameters of the pipeline, a proximate wellhead, a water injection unit, and the like.

Although the fiber optic cable 306 can be used for other purposes, detection of the acoustic signal is based on the sensitivity of the fiber optic cable 306 to the sound waves of the acoustic signal 304. While fiber optic cables 306 used for pipeline monitoring may be designed to detect the acoustic signals, fiber optic cables 306 may be used for other purposes, such as communications, and may not be inherently sensitive to pressure changes. Accordingly, a fiber optic cable 306 that is to be used for field communications may be selected to allow for use in process monitoring. The fiber optic cable 306 is optically coupled to a fiber optic analyzer (FOA) 308.

The FOA 308 includes an optical unit 310 to convert light from the fiber optic cable 306 into the electrical signal. As noted herein, the optical unit 310 may also provide light to the fiber optic cable 306, for example, as a pulse train for time domain reflectometry (TDR). In TDR, a small amount of the light is naturally scattered, mostly through Rayleigh backscattering due to small variations in the refractive index of the fiber, and returned to the FOA 308. By recording the measured intensity of reflected light as a function of time after transmission, the FOA 308 is able to measure characteristics of the scattered light generated all along the fiber.

The FOA 308 may include a signal decoding device (SDD) 312, which can take the electrical signal and decode it, for example, into a digital signal. In one embodiment, the digital signal may be a time sequence of three dimensional data arrays that includes signal intensity (z) over frequency (x) and distance (y) from the FOA 308. As described herein, the SDD 312 may use any number of technologies, such as FFTs, to generate the time dimensional data arrays. In other embodiments, the SDD 312 may use analog filtering techniques, such as high and low bandpass filters, to deconvolute the signals. After deconvolution, the data stream representing the data from the subsea sensor 104 may be provided to an interface 314 to be sent to a control system 316. Similarly, other data streams may be provided to an interface 318 to be sent to another unit 320, such as a pipeline monitoring system or network interface.

Not all of the items shown in FIG. 3 may be used in every embodiment. For example, in some embodiments, the fiber optic cable 306 is specifically placed to detect the data from the ATU 302. In these embodiments, the FOA 308 will not need to deconvolute the data into multiple data streams. In this example, the data stream may be provided directly to the interface 314 to be sent to the control system 316. Accordingly, the other interface 318 and unit 320 may be eliminated. In other embodiments, multiple units may be monitored. Accordingly, the data stream may be deconvoluted into two, three, or more separate data streams, each including data for the respective sensor. In this example, multiple interfaces may be included, each sending data to separate control systems.

Sensors and Transducers

Figure 4:
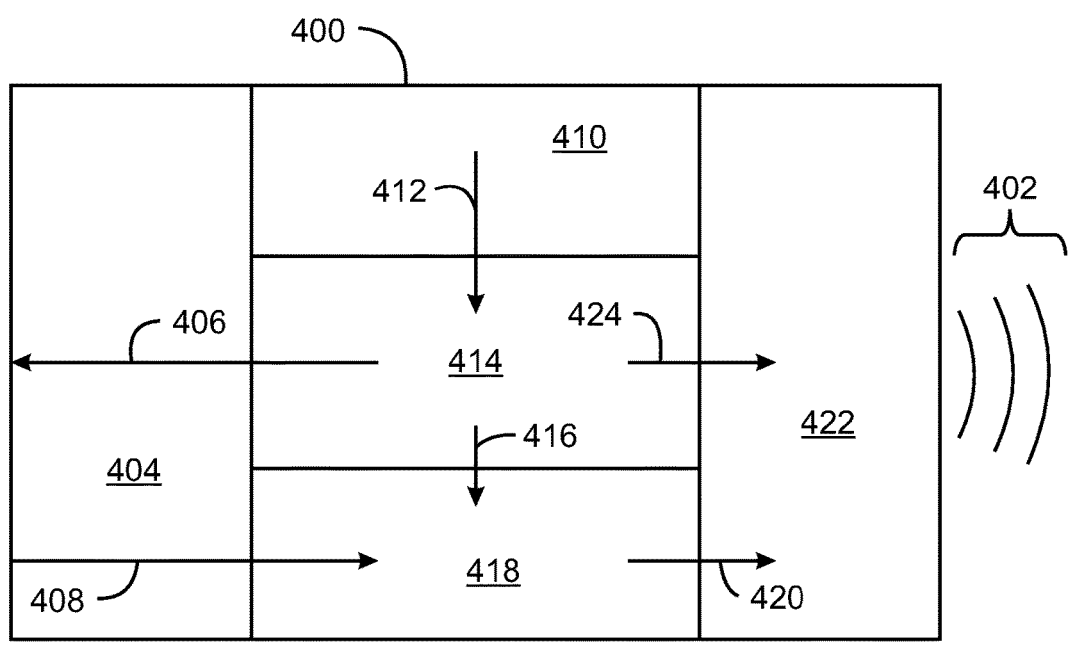
FIG. 4 is a block diagram of an integrated acoustic transducer unit (IATU) that may be used to convert a sensor signal into an acoustic signal.

FIG. 4 is a block diagram of an IATU 400 that may be used to convert a sensor signal into an acoustic signal 402. This may be used, for example, as the ATU 302 discussed with respect to FIG. 3. The IATU 400 includes an interface 404 to the sensor housing.

The interface 404 may be similar in design to the cable connector 106 used to couple a cable 108 to the sensor 104 from an SCM 112, as described with respect to FIG. 1. However, the interface 404 is not limited to that design, and any number of other stock or custom designs may be used for the interface 404, depending on the environmental conditions. For example, the interface 404 may use wet-mated or dry-mated connectors, depending on whether the connections need to be replaced under the water. The interface 404 allows electrical power 406 to pass from the IATU 400 to the sensor housing and sensor signals, e.g., measurement data 408, to pass from the sensor housing to the IATU 400. The IATU 400 may include a power interface 410. The power interface 410 may provide power 412 to a local power source 414. The local power source 414 may include an integral battery and a power distribution system to send power to other units, such as the interface 404. In this embodiment, the power interface 410 would provide power 412 for charging the battery. The connection from the power interface 410 to the local power source 414 may be wet-mated to facilitate replacement in a subsea environment. In some embodiments, the local power source 414 may not have a battery, but may have only a power distribution system. For example, the battery may be located externally to the IATU 400 and may power a number of units. The local power source 414 may provide power 416 to signal processing circuitry 418 in the IATU 400.

The signal processing circuitry 418 converts the measurement data 408 received from the sensor or sensors into a format suitable for acoustic transmission, for example, as described with respect to FIG. 3. Amplification may be provided to increase the intensity of the acoustic signal 402. The converted signal 420 is provided to a transducer 422 for acoustic transmission.

The transducer 422 may be provided power 424 from the local power source 414 to convert the converted signal 420 received from the signal processing circuitry 418 into the acoustic signal 402. The transmission of the acoustic signal 402 may be omnidirectional or multi-directional.

Figure 5:
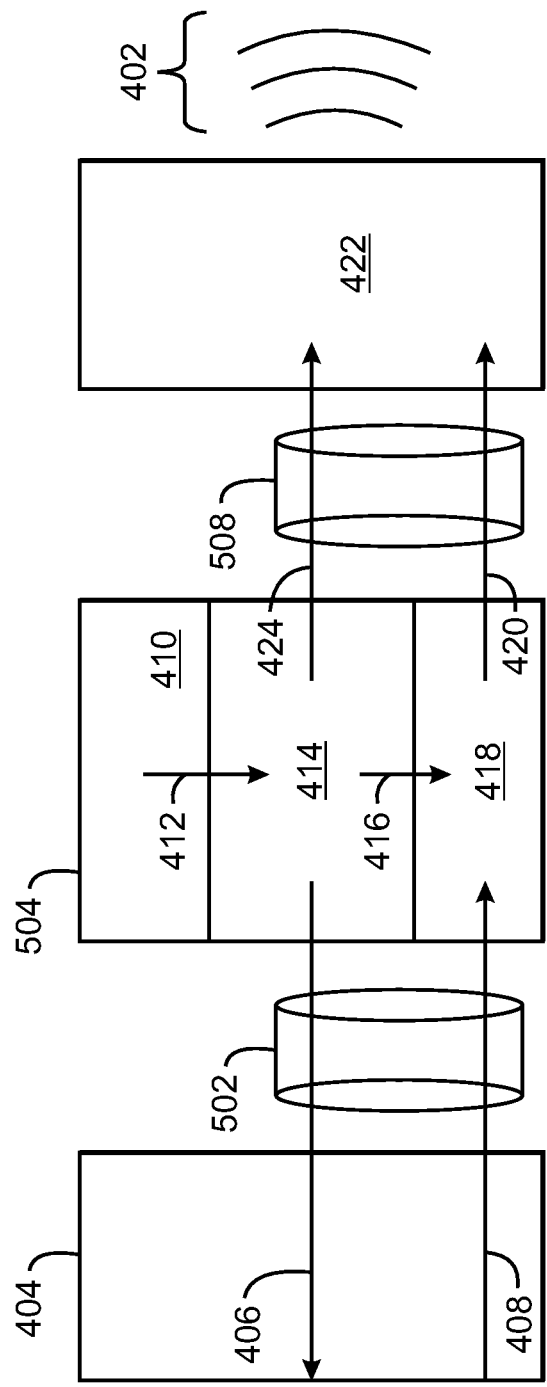
FIG. 5 is a block diagram of modular transducer units that may be used to convert a sensor signal into an acoustic signal.

FIG. 5 is a block diagram of a modular acoustic transducer unit (MATU) 500 that may be used to convert measurement data 408 into an acoustic signal 402. Like numbered items are as described with respect to FIG. 4. The systems described herein are not limited to having an IATU 400, as described with respect to FIG. 4, but may include modular systems, such as MATU 500. For example, a sensor may be monitored through an electrical cable 502 directly wired between the interface 404 to the sensor housing and an ATU 504. If the interface 404 is wired to the electrical cable 502, then multiple cables directly wired to the ATU 504 can be used to connect the ATU 504 to multiple sensors. Further, a separate transducer 422 may be electrically coupled to the ATU 504 by an electrical cable 508 directly wired to the ATU 504. This embodiment may allow for a more effective placement of the transducer 422, e.g., in closer proximity to a fiber optic cable. In addition, multiple electrical cables 508 can be connected to a number of transducers 422 which can be connected to the ATU 504.

Figure 6:
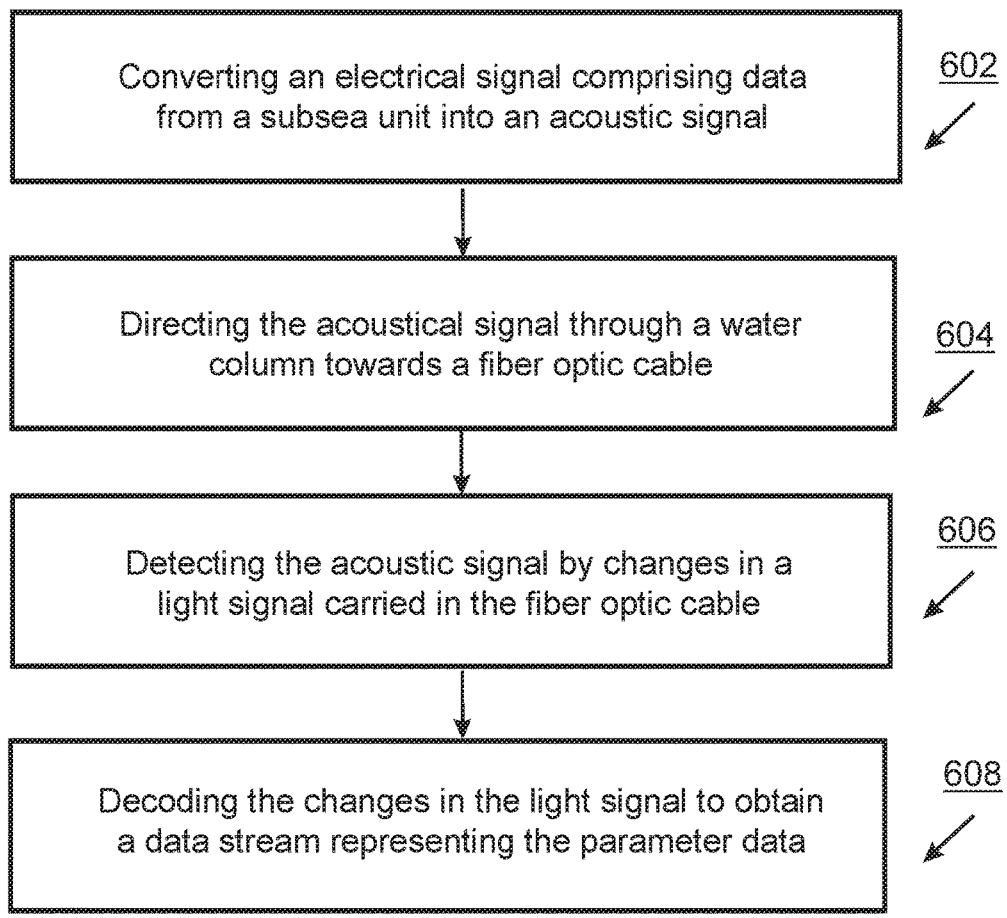
FIG. 6 is a process flow diagram of a method of monitoring a parameter from a subsea sensor using a fiber optic cable detection system.

FIG. 6 is a process flow diagram of a method 600 of monitoring parameter data from a subsea unit using a fiber optic cable detection system. The method 600 begins at block 602, at which an electrical signal comprising data from a subsea unit is converted into an acoustic signal. At block 604, the acoustical signal is directed through the water column towards a fiber optic cable. At block 606, the acoustic signal is detected by changes in a light signal carried in the fiber optic cable. At block 608, the changes in the light signal are decoded to obtain a data stream representing the parameter data from the subsea unit.

The method 600 is not limited to the blocks above, as additional actions may be included. For example, if the fiber optic cable is used to carry data other than the parameter data from the subsea units, then the data stream may be deconvoluted after block 608 to separate the data streams. The separated data streams may then be provided to the relevant systems or units.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A sensing system, comprising:
    a sensor configured to measure parameter data;
    a transducer unit configured to convert an electrical signal from the sensor that is representative of the parameter data into an encoded acoustic signal representative of the electrical signal;
    a fiber optic system in proximity to the transducer unit, wherein the fiber optic system is configured for monitoring or transferring data via optical signals not related to the parameter data and directly detecting the acoustic signal from the transducer unit to produce modified optical signals;
    a fiber optic analyzer configured to decode the modified optical signals from the fiber optic system to produce a data stream; and
    a deconvolution system configured to separate the parameter data from the data stream in the modified optical signals.

2. The sensing system of claim 1, further comprising a subsea unit.

3. The sensing system of claim 1, wherein the encoded acoustic signal is conducted to the fiber optic system through a water column.

4. The sensing system of claim 1, wherein the fiber optic system comprises a pipeline monitoring system, a subsea equipment monitoring system, or both.

5. The sensing system of claim 1, wherein the fiber optic system comprises a communications system.

6. The sensing system of claim 1, wherein the transducer unit is modular.

7. The sensing system of claim 1, wherein the transducer unit comprises an internal power supply.

8. The sensing system of claim 7, wherein the internal power supply is configured to be charged from an external power source.

9. The sensing system of claim 1, comprising a power connection from an external power source.

10. The sensing system of claim 1, wherein the data stream comprises a time sequence of three dimensional data arrays comprising signal intensity (z) over frequency (x) and distance from the fiber optic analyzer (y).

11. The sensing system of claim 1, wherein the sensor is a subsea sensor and the parameter data includes a temperature, a pressure, a level, or any combinations thereof.

12. The sensing system of claim 1, comprising a wetmated connection between the sensor and the transducer unit.

13. The sensing system of claim 1, comprising an electrical cable directly wiring the sensor to the transducer unit.

14. The sensing system of claim 1, comprising a plurality of sensors each directly wired to the transducer unit.

15. The sensing system of claim 1, comprising a wetmated connection between an external power source and an internal power source.

16. The sensing system of claim 1, comprising a plurality of sensors and a plurality of transducer units each transducer unit configured to convert the electrical signal received into an acoustic signal.

17. A method for monitoring a subsea unit, comprising:
    converting an electrical signal comprising parameter data from the subsea unit into an acoustic signal;
    directing the acoustic signal through a water column towards a fiber optic cable;
    directly detecting, by the fiber optic cable, the acoustic signal by changes in a light signal carried in the fiber optic cable; and
    decoding the changes in the light signal to obtain a data stream representing the parameter data.

18. The method of claim 17, comprising converting the electrical signal into a digital data stream prior to converting the parameter data into the acoustic signal.

19. The method of claim 17, comprising separating the parameter data from data not related to the parameter data by deconvolution, and sending the parameter data to a control system.

20. The method of claim 17, comprising placing the fiber optic cable proximate to a source of the acoustic signal.

21. The method of claim 17, comprising placing a source of the acoustic signal proximate to the fiber optic cable.

22. The method of claim 17, comprising monitoring a pipeline with the fiber optic cable.

23. The method of claim 17, comprising carrying a network communications signal over the fiber optic cable.

24. A method for monitoring data, comprising:
    converting an electrical signal comprising parameter data into an acoustic signal;
    directly detecting the acoustic signal by changes in a light signal carried in a fiber optic cable that is also carrying other data unrelated to the parameter data;
    converting the light signal into an electrical signal representing a data stream; and
    deconvoluting the electrical signal to separate the parameter data from the data stream.

25. The method of claim 24, comprising sending the data stream to a control system.

26. The method of claim 24, wherein the other data is related to monitoring a pipeline in a separate monitoring system using the fiber optic cable.

* * * * *